Dec. 29, 1964    A. R. THOMPSON    3,163,490
MARKER FOR DIRECT WRITING RECORDER
Filed Nov. 8, 1962    2 Sheets-Sheet 1

INVENTOR.
ALLAN R. THOMPSON
BY
*Eber J. Hyde*
ATTORNEY

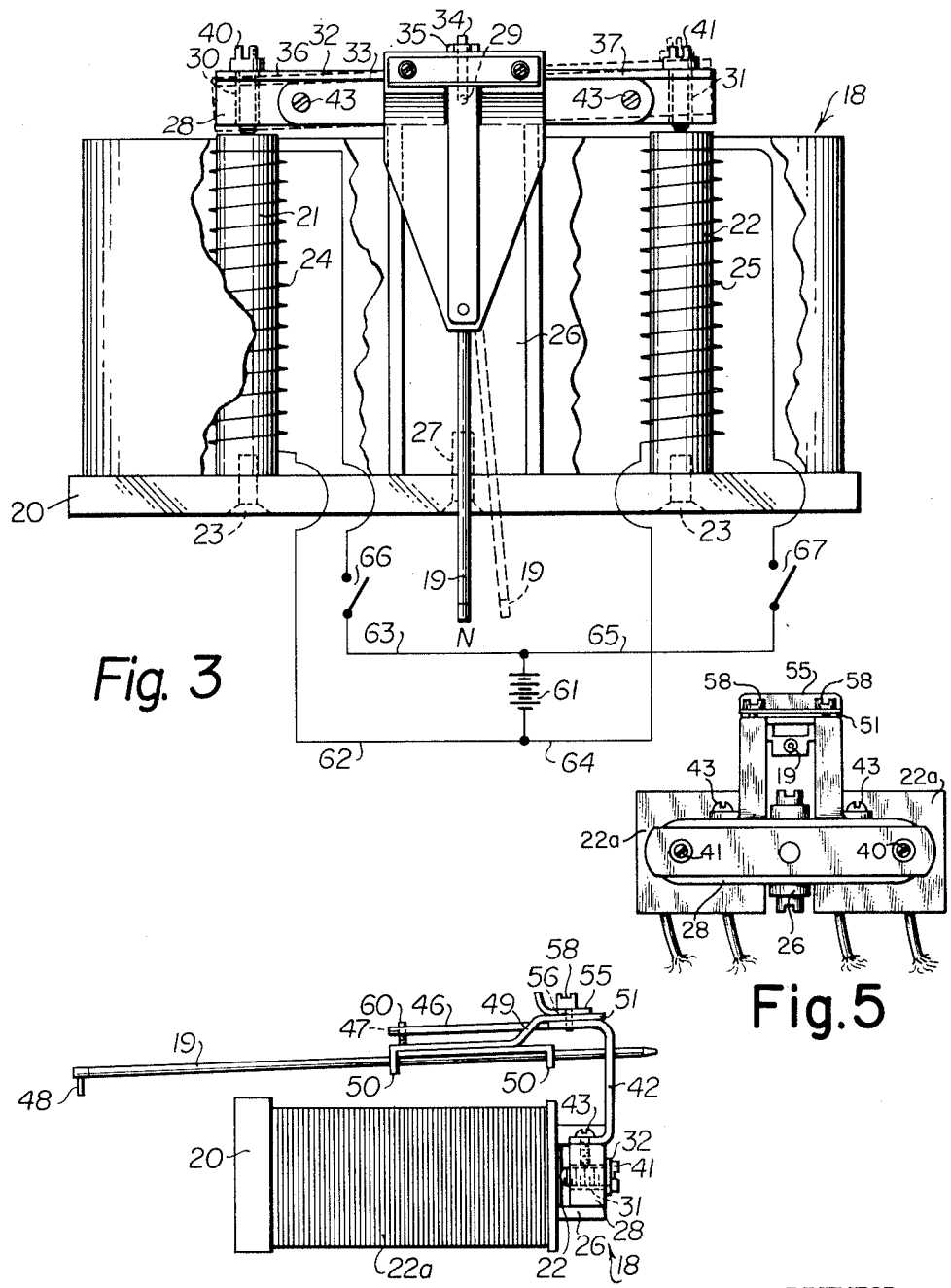

United States Patent Office 3,163,490
Patented Dec. 29, 1964

3,163,490
MARKER FOR DIRECT WRITING RECORDER
Allan R. Thompson, Westlake, Ohio, assignor to
Clevite Corporation, a corporation of Ohio
Filed Nov. 8, 1962, Ser. No. 236,295
6 Claims. (Cl. 346—139)

This invention relates to a marker device for a direct writing recorder, sometimes called an event marker to distinguish it from the regular pen which draws on the paper chart a line indicative of separate phenomena.

The function of the event marker is to provide short, sharp lines at the edge of the paper chart so that an engineer studying the chart can determine from the marks made by the event marker exactly what the time relationship was between the event and the phenomena recorded by the regular pen.

An object of the invention is to provide a marker device that has a marker pen which can move in either of two different directions from a neutral position so as to indicate either of two different conditions, as well as the neutral position.

An object of the invention is to provide a marker device wherein means are provided to overcome the friction of the pen point on the paper after the pen point has indicated a condition and will always return the pen point to a neutral position, and will do so even though the marker pen swings either to the right or to the left of neutral.

For a better understanding of the present invention, together with other and further objects thereof, reference is had to the following description taken in connection with the accompanying drawings, and its scope will be pointed out in the appended claims.

With reference to the drawings there is shown in FIGURE 1 a front view of a direct writing recorder with the marker of this invention mounted on the recorder to one side of the regular pen;

FIGURE 3 is a greatly enlarged top view of the marker with certain parts being broken away and a schematic view of the electrical circuits for the marker;

FIGURE 4 is a side view of the marker;

FIGURE 5 is a rear view of the marker, on a greatly reduced scale; and

In the past marker pens for direct writing recorders have been made to swing in only one direction and therefore would indicate only one condition. One type of marker that has been made in the past is comprised of a U-shaped permanent magnet and a torque spring having one end fixedly secured to the bight of the permanent magnet. A coil is fixedly secured to the other end of the torque spring and is positioned between the north and south poles of the permanent magnet. A pen is fixedly secured to the coil. A battery is in an electrical circuit with the coil. A switch is mounted in the electrical circuit between the battery and the coil. When the switch is closed a magnetic field is created around the coil which opposes the magnetic field of the permanent magnet and this causes the coil to rotate about the longitudinal axis of the torque spring and the coil rotates as far as the torque spring will allow. When the switch is opened the torque spring rotates the coil toward the neutral position. The disadvantage of this marker is that the friction of the pen point on the paper causes the pen to stop and not to return to the neutral position. Thus the pen stops at an angle of from one to three degrees from a neutral position. This means that the marker pen does not write accurately. The torque spring has the characteristic that when the marker pen is at its maximum angular position away from neutral its torque is greatest, and as the pen approaches the neutral position the torque approaches zero. When the pen is in its neutral position the torque is zero.

In the applicant's invention a marker for a direct writing recorder has been provided. The marker includes a pen that swings in both directions so that the marker indicates two different conditions in addition to neutral. The marker also includes a spring that is so arranged that the pen will overcome the friction of the pen point on the paper and will always return to the neutral position after it has indicated a condition. This also means that pen points and mounting systems can be used that have appreciable friction between the paper and the pen. The spring system of the present device is such that when the pen is at its neutral position there is zero restoring force being exerted on the pen but immediately upon the pen being moved, even the slightest amount, an exceedingly high restoring force is applied to the pen.

Figure 1:
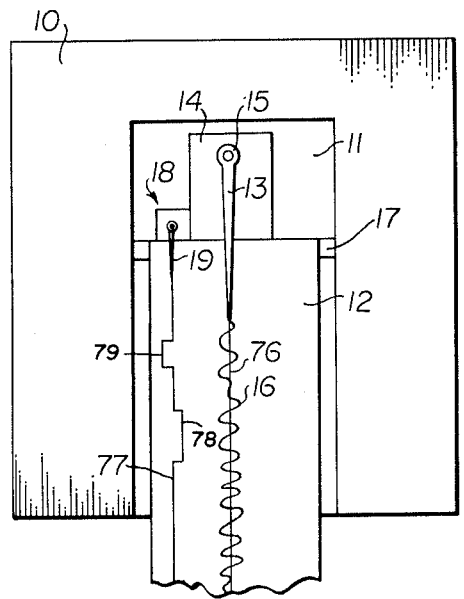

In FIG. 1 of the drawings, 10 generally designates a direct writing recorder having a window 11. A paper chart 12 is movable through the window 11 and a pen 13 is carried by the recorder 10 for writing on the chart. A motor device 14 is connected to the pen 13 to rotate it about a pivot 15, as is known in the art, so that the pen writes a wavy line 16 on the chart 12. The chart 12 is in the form of a paper strip wound on a roll mounted in the recorder 10 and means are provided to drive the chart past the pen during a recording operation. A bar 17 is fixedly secured to the recorder 10 to aid in guiding the chart paper, and a marker generally designated 18 is secured in the device 10 adjacent the motor device 14 for writing along the edge of the chart 12.

Figure 6:
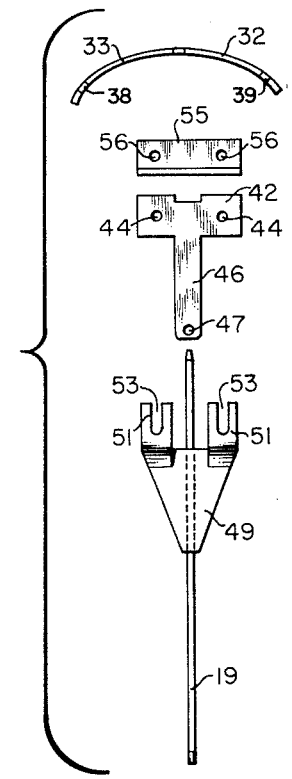
FIGURE 6 is an exploded view of some of the components of the marker.
Figure 2:
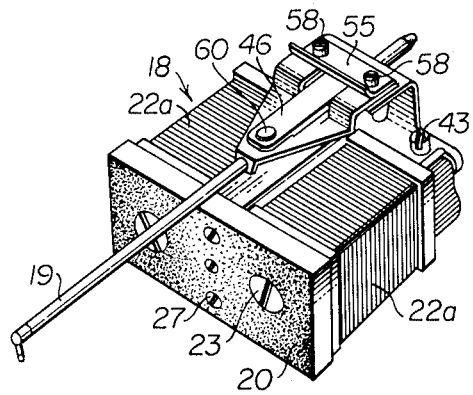
FIGURE 2 is a perspective view of the marker.

With reference to FIGURES 2 to 6, the marker 18 is comprised of a base 20 and a pair of cores 21 and 22 fabricated of ferromagnetic material. The cores 21 and 22 are arranged in spaced parallel relation and each core has one end fixedly secured to the base 20 by a screw 23. A coil 24 is wound around the core 21 and a coil 25 is wound around the core 22. A plastic cover 22a is formed around each core and its respective coil for protective purposes. As particularly shown in FIGURE 3, a support 26 is positioned between the cores 21 and 22 and is fixedly secured to the base 20 by screws 27. A member 28 is pivotally connected to the support 26 midway of its ends by a pivot pin 29. The member 28 has one face spaced from the adjacent ends of the cores 21 and 22. The member 28 is provided with an opening 30 adjacent one end thereof and is provided with an opening 31 adjacent the other end thereof. A leaf spring 32 is bowed as shown in FIGURE 6 before it is assembled on the marker 18. The leaf spring 32 has its concave face 33 positioned against the other face of the member 28. The leaf spring 32 is fixedly secured to the member 28 midway of its ends by a screw 34 and a nut 35. This leaves a section 36 of the leaf spring 32 on one side of the screw 34 and a section 37 of the leaf spring on the other side of the screw 34. The leaf spring 32 is provided with an internally threaded opening 38 adjacent one end thereof and is provided with an internally threaded opening 39 adjacent the other end thereof. A screw 40 is in threaded engagement with the internally threaded opening 38 in the leaf spring 32 and extends through the opening 30 in the member 28 and is in contact with the core 21. A screw 41 is in threaded engagement with the internally threaded opening 39 in the leaf spring 32 and extends through the opening 31 in the member 28 and is in contact with the core 22.

As best shown in FIGURE 4, a bracket 42 is fixedly secured to the member 28 by screws 43. The bracket 42 is provided with a pair of spaced internally threaded openings 44. An extension 46 is made integral with the bracket 42 and is provided with an internally threaded opening 47. The pen 19 is provided with a hollow pen shank and a pen point 48. The pen point 48 is for writing on the chart 12. Ink is supplied to the pen point 48 through the hollow pen shank. A bracket 49 is provided with a pair of spaced flanges 50 and the pen shank extends tightly through these flanges to fixedly secure the bracket to the pen shank. The bracket 49 is provided with a pair of arms 51 arranged in spaced parallel relation with respect to each other. Each arm 51 extends diagonally outwardly from the pen shank and then extends parallel to the pen shank as shown in FIGURE 4. The arms 51 are provided with slots 53 extending inwardly from their free ends. The arms 51 are positioned against the bracket 42 with the extension 46 projecting between the arms 51. A plate 55 is positioned against the arms 51 of the bracket 49. The plate 55 is provided with a pair of spaced openings 56. A pair of screws 58 extend through the openings 56 in the plate 55 and the slots 53 in the arms 51 of the bracket 49 and are in threaded engagement with the openings 44 in the bracket 42. A screw 60 is in threaded engagement with the opening 47 in the extension 46 and bears against the bracket 49.

As shown in FIGURE 3, a source of electricity is provided. This source of electricity may be a battery or a direct current generator or an alternating current generator. In this invention a battery 61 is used. The battery 61 is connected to the coil 24 by a pair of wires 62 and 63. The battery 61 is connected to the coil 25 by a pair of wires 64 and 65. A switch 66 is provided in the wire 63. A switch 67 is provided in the wire 65.

The operation of the marker 18 is as follows: When the switch 66 is closed a magnetic field is created about the core 21 which causes the member 28 to swing about pivot pin 29 into contact with the core 21. This causes the section 36 of the leaf spring 32 to be spaced from the member 28 resulting in swinging of the pen 19 in a counterclockwise direction and causes bending at the center of section 36 of the leaf spring 32 downwardly as shown in dotted lines in FIGURE 3. When the switch 66 is opened the bent section 36 of the leaf spring 32 serves as a restoring force to return the member 28 and the pen 19 to a neutral position N. When the switch 67 is closed a magnetic field is created about the core 22 which causes the member 28 to swing about pivot pin 29 into contact with the core 22. This causes the section 37 of the leaf spring 32 to be spaced from the member 28 resulting in swinging of the pen 19 in a clockwise direction as seen in FIGURE 3 and causes bending of the section 37 of the leaf spring 32. When the switch 67 is opened the bent section 37 of the leaf spring 32 serves as a restoring force to return the member 28 and the pen 19 to the neutral position N.

As best shown by FIGURES 4 and 6, the length of the pen 19 may be adjusted by loosening the screws 58 and then sliding the pen by the slots 53 moving relative to the screws 58 and then tightening the screws 58. There is a clearance between the walls of the slots 53 and the screws 58. The pen 19 may be adjusted to a limited amount about its swinging axis by loosening the screws 58 and then swinging the pen in a clockwise or counterclockwise direction to the desired location and then tightening the screws 58. The pressure of the pen point 48 on the paper can be increased by turning the screw 60 in a clockwise direction and can be decreased by turning the screw 60 in a counterclockwise direction as viewed in FIGURE 2.

The advantages of the marker 18 of this invention are as follows: The pen 19 will always return to its neutral position N as shown in FIGURE 3. This also means that marker pen points that have appreciable friction on the paper can be used. The marker pen 19 will indicate two different conditions because it swings in either of two directions. Since the marker 18 uses the movable iron member 28 rather than a movable coil there is appreciable torque to move the pen 19 against pen point friction on the paper.

The advantages of the mounting of the pen 19 are as follows: The screws 58 do not have to be removed when it is desired to put in a new pen. It is only necessary to loosen the screws 58 and then the pen slides out through the slots 53. The length of the pen 19 is adjustable over a limited range for time axis correlation. The pen 19 is adjustable about its swinging axis. The pressure of the pen point 48 on the paper is adjustable.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A marker for a direct writing recorder comprising a frame, a first core fabricated of ferromagnetic material and fixedly secured to the frame, a second core fabricated of ferromagnetic material and spaced from the first core and fixedly secured to the frame, a first coil positioned on the first core, a second coil positioned on the second core, a member movably mounted on the frame, resilient means carried by the member and in engagement with said member at least two spaced apart areas and exerting a given force against said member at each of said areas, a pen carried by the member, circuit means for connecting a source of electricity to the first and second coils, a first switch between the source of electricity and the first coil and when closed causing a magnetic field to be created about the first core which causes the member to move into contact with the first core resulting in movement of the pen in one direction and resulting in a force exerted by said member against said resilient means at one end thereof of sufficient magnitude to overcome said given force and cause said one end of said resilient means to move away from said second core, and causing straining of the resilient means to create a restoring force to return the member and the pen to a neutral position when the first switch is opened, and a second switch between the source of electricity and the second coil and when closed causing a magnetic field to be created about the second core which causes the member to move into contact with the second core resulting in movement of the pin in the opposite direction and resulting in a force exerted by said member against said resilient means at the other end thereof of sufficient magnitude to overcome said given force and cause said other end of said resilient means to move away from said first core, and causing straining of the resilient means to create a restoring force to return the member and the pen to a neutral position when the second switch is opened.

2. A marker for a direct writing recorder comprising a frame, a first core fabricated of ferromagnetic material and fixedly secured to the frame, a second core fabricated of ferromagnetic material and spaced from the first core and fixedly secured to the frame, a first coil positioned on the first core, a second coil positioned on the second core, a member pivotally connected to the frame, a preloaded spring fixedly secured to the member at one location and in engagement with said member at at least two spaced apart areas and exerting a given force against said member at each of said areas, a first element fixedly secured to the leaf spring and in contact with the first core, a second element fixedly secured to the leaf spring and in contact with the second core, a pen fixedly secured to the member, a source of electricity connected to the first and second coils, a first switch between the source of electricity and the first coil and when closed causing a magnetic field to be created about the first core which causes the member to swing about its pivot point into contact with the first core resulting in swinging of the pen in one direction and resulting in a force exerted by said member against said resilient means at one end thereof of sufficient magnitude to overcome said given force and cause said one end of said resilient means to move away from said second core, and causing additional loading of the spring to increase the existing restoring force to return the member and the pen to a neutral position when the first switch is opened, and a second switch between the source of electricity and the second coil and when closed causing a magnetic field to be created about the second core which causes the member to swing about its pivot point into contact with the second core resulting in swinging of the pen in the opposite direction and resulting in a force exerted by said member against said resilient means at the other end thereof of sufficient magnitude to overcome said given force and cause said other end of said resilient means to move away from said first core, and causing additional loading of the spring to increase the existing restoring force to return the member and the pen to the neutral position when the second switch is opened.

3. A marker for a direct writing recorder comprising a frame, a first core fabricated of ferromagnetic material and fixedly secured to the frame, a second core fabricated of ferromagnetic material and spaced from the first core and fixedly secured to the frame, a first coil positioned on the first core, a second coil positioned on the second core, a member pivotally connected to the frame, a bowed leaf spring having its concave face positioned against the member and fixedly secured to the member at one location and in engagement with said member at at least two spaced apart areas and exerting a given force against said member at each of said areas, a first element fixedly secured to the leaf spring and in contact with the first core, a second element fixedly secured to the leaf spring and in contact with the second core, a pen fixedly secured to the member, a source of electricity connected to the first and second coils, a first switch between the source of electricity and the first coil and when closed causing a magnetic field to be created about the first core which causes the member to swing about its pivot point into contact with the first core resulting in swinging of the pen in one direction and resulting in a force exerted by said member against said resilient means at one end thereof of sufficient magnitude to overcome said given force and cause said one end of said resilient means to move away from said second core, and causing additional straining of the leaf spring to increase the existing restoring force to return the member and the pen to a neutral position when the first switch is opened, and a second switch between the source of electricity and the second coil and when closed causing a magnetic field to be created about the second core which causes the member to swing about its pivot point into contact with the second core resulting in swinging of the pen in the opposite direction and resulting in a force exerted by said member against said resilient means at the other end thereof of sufficient magnitude to overcome said given force and cause said other end of said resilient means to move away from said first core, and causing additional straining of the leaf spring to increase the existing restoring force to return the member and the pen to the neutral position when the second switch is opened.

4. A marker for a direct writing recorder comprising a base, a first core fabricated of ferromagnetic material and having one end fixedly secured to the base, a second core fabricated of ferromagnetic material arranged in spaced parallel relation with the first core and having one end fixedly secured to the base, a first coil positioned on the first core, a second coil positioned on the second core, a support positioned between the first and second cores and fixedly secured to the base, a member pivotally connected to the support midway of its ends and having one face spaced from the other ends of the first and second cores and provided with a first opening adjacent one end thereof and a second opening adjacent the other end thereof, a leaf spring positioned against the other face of the member and fixedly secured to the member midway of its ends leaving a first section of the leaf spring on one side of the point of securement and a second section of the leaf spring on the other side of the point of securement, a first securing element fixedly secured to the first section of the leaf spring and extending through the first opening in the member and in contact with the first core, a second securing element fixedly secured to the second section of the leaf spring and extending through the second opening in the member and in contact with the second core, a pen positioned at right angles to the member midway of the ends thereof and fixedly secured thereto, a source of electricity connected to the first and second coils, a first switch between the source of electricity and the first coil and when closed causing a magnetic field to be created about the first core which causes the member to swing about its pivot point into contact with the first core and causing the first section of the leaf spring to be spaced from the member resulting in swinging of the pen in one direction and bending the first section of the leaf spring to increase the existing restoring force to return the member and the pen to a neutral position when the first switch is opened, and a second switch between the source of electricity and the second coil and when closed causing a magnetic field to be created about the second core which causes the member to swing about its pivot point into contact with the second core and causing the second section of the leaf spring to be spaced from the member resulting in swinging of the pen in the opposite direction and bending the second section of the leaf spring to increase the existing restoring force to return the member and the pen to the neutral position when the second switch is opened.

5. A marker for a direct writing recorder comprising a base, a first core fabricated of ferromagnetic material and having one end fixedly secured to the base, a second core fabricated of ferromagnetic material arranged in spaced parallel relation with the first core and having one end fixedly secured to the base, a first coil positioned on the first core, a second coil positioned on the second core, a support positioned between the first and second cores and fixedly secured to the base, a member pivotally connected to the support midway of its ends and having one face spaced from the other ends of the first and second cores and provided with a first opening adjacent one end thereof and a second opening adjacent the other end thereof, a bowed leaf spring having its concave face positioned against the other face of the member and fixedly secured to the member midway of its ends leaving a first section of the leaf spring on one side of the point of securement and a second section of the leaf spring on the other side of the point of securement, a first securing element fixedly secured to the first section of the leaf spring and extending through the first opening in the member and in contact with the first core, a second securing element fixedly secured to the second section of the leaf spring and extending through the second opening in the member and in contact with the second core, a pen positioned at right angles to the member midway of the ends thereof and fixedly secured thereto, a source of electricity connected to the first and second coils, a first switch between the source of electricity and the first coil and when closed causing a magnetic field to be created about the first core which causes the member to swing about its pivot point into contact with the first core and causing the first section of the leaf spring to be spaced from the member resulting in swinging of the pen in one direction and bending the first section of the leaf spring to increase the existing restoring force to return the member and the pen to a neutral position when the first switch is opened, and a second switch between the source of electricity and the second coil and when closed causing a magnetic field to be created about the second core which causes the member to swing about its pivot point into contact with the second core and causing the second section of the leaf spring to be spaced from the member resulting in swinging of the pen in the opposite direction and bending the second section of the leaf spring to increase the existing restoring force to return the member and the pen to the neutral position when the second switch is opened.

6. A marker for a direct writing recorder comprising a frame, a member pivotally connected to the frame, a first bracket fixedly secured to the member and provided with a pair of spaced internally threaded openings and having an extension and the extension being provided with an internally threaded opening, a pen including a pen shank and a pen point for writing on a chart, a second bracket fixedly secured to the pen shank and including a pair of arms arranged in spaced parallel relation and the arms being provided with slots extending inwardly from their free ends and the arms being positioned against the first bracket and the extension projecting between the arms, a plate positioned against the arms of the second bracket and provided with a pair of spaced openings, a pair of screws extending through the openings in the plate and the slots in the arms of the second bracket and in threaded engagement with the openings in the first bracket, the slots in the arms of the second bracket making the length of the pen adjustable and also making the pen adjustable about its swinging axis, and a third screw in threaded engagement with the internally threaded opening in the extension and bearing against the second bracket to adjust the pressure of the pen point on the chart.

References Cited by the Examiner
UNITED STATES PATENTS

| | | | |
|---|---|---|---|
| 1,322,148 | 11/19 | Sprague | 346—62 |
| 1,741,936 | 12/29 | Harwig | 346—116 |
| 2,185,603 | 1/40 | Miller | 317—197 |
| 2,346,802 | 4/44 | Walker | 346—62 |

LEYLAND M. MARTIN, *Primary Examiner.*

L. SMILOW, *Examiner.*